United States Patent [19]

Roberts

[11] Patent Number: 5,416,298
[45] Date of Patent: May 16, 1995

[54] LASER ENGRAVING APPARATUS

[75] Inventor: Simon H. Roberts, Hersham, England

[73] Assignee: Zed Instruments Limited, Hersham, United Kingdom

[21] Appl. No.: 39,134

[22] PCT Filed: Oct. 18, 1991

[86] PCT No.: PCT/GB91/01829

§ 371 Date: Apr. 2, 1993

§ 102(e) Date: Apr. 2, 1993

[87] PCT Pub. No.: WO92/09399

PCT Pub. Date: Jun. 11, 1992

[30] Foreign Application Priority Data

Nov. 23, 1990 [GB] United Kingdom ............... 9025517

[51] Int. Cl.⁶ ............................................. B23K 26/00
[52] U.S. Cl. .......................... 219/121.68; 219/121.69; 219/121.75; 219/121.82; 372/13
[58] Field of Search ...................... 219/121.68, 121.69, 219/121.67, 121.82, 121.75; 372/13

[56] References Cited

U.S. PATENT DOCUMENTS

| | | | |
|---|---|---|---|
| 4,336,439 | 6/1982 | Sasnett et al. | 219/121.68 |
| 4,547,023 | 8/1990 | Minamida et al. | 219/121.68 |
| 4,547,651 | 10/1985 | Maruyama | 219/121.67 |
| 5,109,149 | 4/1992 | Leung | 219/121.69 |

FOREIGN PATENT DOCUMENTS

| | | |
|---|---|---|
| 2241850 | 3/1974 | Germany . |
| 2709554 | 9/1977 | Germany . |
| 2719275 | 11/1977 | Germany . |
| 2009558 | 6/1979 | United Kingdom . |

Primary Examiner—Mark H. Paschall
Attorney, Agent, or Firm—Sughrue, Mion, Zinn, Macpeak & Seas

[57] ABSTRACT

An apparatus for preparing a medium for use in a printing process supports the medium (2) for rotation about an axis. A head (6) is mounted for movement parallel to the axis and includes means to direct a laser beam onto the surface of the medium. The laser beam engraves or exposes the series of cell sites (c) around the medium and an acousto-optic modulator (12) positioned in the path of the laser beam deflects the beam substantially in the direction of rotation of the medium (2). In a preferred example the beam tracks the surface of the medium at a speed matched to that of the medium so as to keep the beam stationary on the cell site while that site is being engraved or exposed. The beam may also be deflected to skip backwards or forwards over immediately adjacent cell sites.

17 Claims, 5 Drawing Sheets

LASER ENGRAVING APPARATUS

BACKGROUND TO THE INVENTION

The present invention relates to the preparation of cylinders for use in printing. It has particular relevance to the engraving of anilox rollers but is also applicable to other processes involving the engraving or exposure of cells on a rotating medium.

In conventional systems for preparing anilox cylinders, a ceramic-coated roller is rotated and a laser engraving head is moved along the roller parallel to its axis. The engraving head may, for example, include a plane mirror and lens which focuses light from a laser onto the surface of the roller. The laser is pulsed and the combined effect of the rotation of the roller and the lateral movement of the engraving head is to produce a helical pattern of cells with one cell corresponding to each pulse from the laser. By appropriate synchronisation of roller rotation, the speed of the engraving head, and the laser pulsing, the cells can be arranged in hexagonal, square or other patterns.

Whilst conventional engraving techniques, such as that described above, are generally satisfactory at lower speeds, a number of problems arise as the rate at which the cells are engraved increases. When engraving separated cells, for example, it is found that at high rotational speeds each cell tends to be elongated in the direction of rotation of the roller, producing a cell which is oval in form. When engraving contiguous cells at high speeds the wall between adjacent cells tends to break down, an effect known as "channelling". In order to avoid such effects, known techniques have in practice been limited to the use of engraving frequencies of less than 10 kHz. A typical cell density is 22000/cm$^2$ and a typical roller size is greater than 10000 cm$^2$ At a rate of 10 kHz, such a roller takes at least six hours to engrave. Significant advantages would be realised by any system making possible an increase in the engraving frequency.

SUMMARY OF THE INVENTION

According to the present invention, an apparatus for preparing a medium for use in a printing process comprises means to support the medium for rotation about an axis and a head mounted for movement parallel to the axis including means to direct a laser beam onto the surface of the medium to engrave or expose a series of cell sites around the medium characterised by an acousto-optic modulator positioned in the path of the laser beam and arranged to deflect the beam substantially in the direction of rotation of the medium.

The present inventor has found that the use of an acousto-optic modulator (also called AOM or acousto-optic Bragg cell) to deflect the beam in the direction of rotation of the medium makes possible the engraving of cells at a significantly increased rate, at frequencies greater than 10 kHz, whilst avoiding the disadvantages encountered with conventional techniques at such high engraving rates. It is known from GB-A-2009558 to use an acousto-optical cell in a scanning apparatus to correct for any deviation of a scanned beam in the direction transverse to the scanning direction.

Preferably the medium is a cylinder for use in a printing process.

Preferably the acousto-optic modulator is arranged to deflect the beam so that it tracks the surface of the cylinder at a speed matched to the medium to keep the beam stationary on a cell site while that site is being engraved or exposed.

The use of the acousto-optic modulator makes it possible to track cell sites and thereby to avoid elongation of the cells even when engraving at high rotational speeds.

Preferably the laser is a continuous wave (CW) laser and the acousto-optic modulator is arranged to deflect the beam between cell sites at a speed very much greater than the speed of rotation of the medium. Alternatively, a pulsed laser may be used in order to provide the high instantaneous power need, for example, in order to engrave deep cells.

In this preferred aspect of the invention, after the engraving of each cell site there is a "flyback" in which the beam is moved at high speed relative to the surface of the cylinder to the next site to be engraved. During flyback the beam may be cut off by switching off the RF power to the acousto-optic modulator. When a CW laser is used since such lasers run at saturation they are much less prone to optical instability resulting from changes in the degree of reflection from the cylinder and the optical system to the optical cavity. When a pulsed laser is used the beam is switched off during flyback, reducing the energy incident on the acousto-optic modulator.

Preferably during the flyback the beam is deflected between the successive sites in the direction of rotation, but alternatively the AOM may be configured to deflect the beam parallel to the axis to laterally adjacent cell sites.

Preferably after the engraving of one cell site the acousto-optic modulator is arranged to deflect the beam to a cell site other than the sites immediately preceding and following the one cell site in the direction of rotation of the medium.

A further distinctive feature of the present invention is that it makes it possible for the beam to jump backwards and forwards between cell sites to engrave or expose sites in a different order. This is of particular value in eliminating the channelling effect described above. When adjacent cells are engraved in quick succession, material dribbles from one cell into the cell formed immediately beforehand. The wall to the previous cell is broken through because that previous cell is still relatively hot. Using the apparatus of the present invention, it is possible to follow the engraving of one cell site by jumping to an non-contiguous site and then in due course to come back to engrave the intermediate site or sites after the one site has had time to cool. Furthermore the beam may be deflected back to engrave the same one site on a second or further occasion, making possible the production of deeper cells of better quality using less power.

Preferably the acousto-optic cell is arranged to split the laser beam to engrave a plurality of sites on the medium simultaneously. Preferably the acousto-optic cell includes means for applying two RF exciting frequencies simultaneously.

As discussed above, it is particularly advantageous to deflect the beam to track a cell site as it is being engraved. Although the preferred method of deflection is the use of an acousto-optic cell other means may be used, such as a piezo-electrically driven mirror or a holographic deflector.

According to a further aspect of the present invention, an apparatus for preparing a medium for use in a printing process comprises means to support the medium for rotation about an axis and a head mounted for movement parallel to the axis and including means to direct a laser beam onto the surface of the medium to engrave or expose a series of cell sites around the medium and means to deflect beam in the direction of rotation of the medium so as to track a cell site while the cell site is engraved or exposed.

BRIEF DESCRIPTION OF THE DRAWINGS

An apparatus in accordance with the present invention will now be described in detail and contrasted with the prior art with reference to the accompanying drawings in which.

DESCRIPTION OF PREFERRED EXAMPLE

Figure 1:
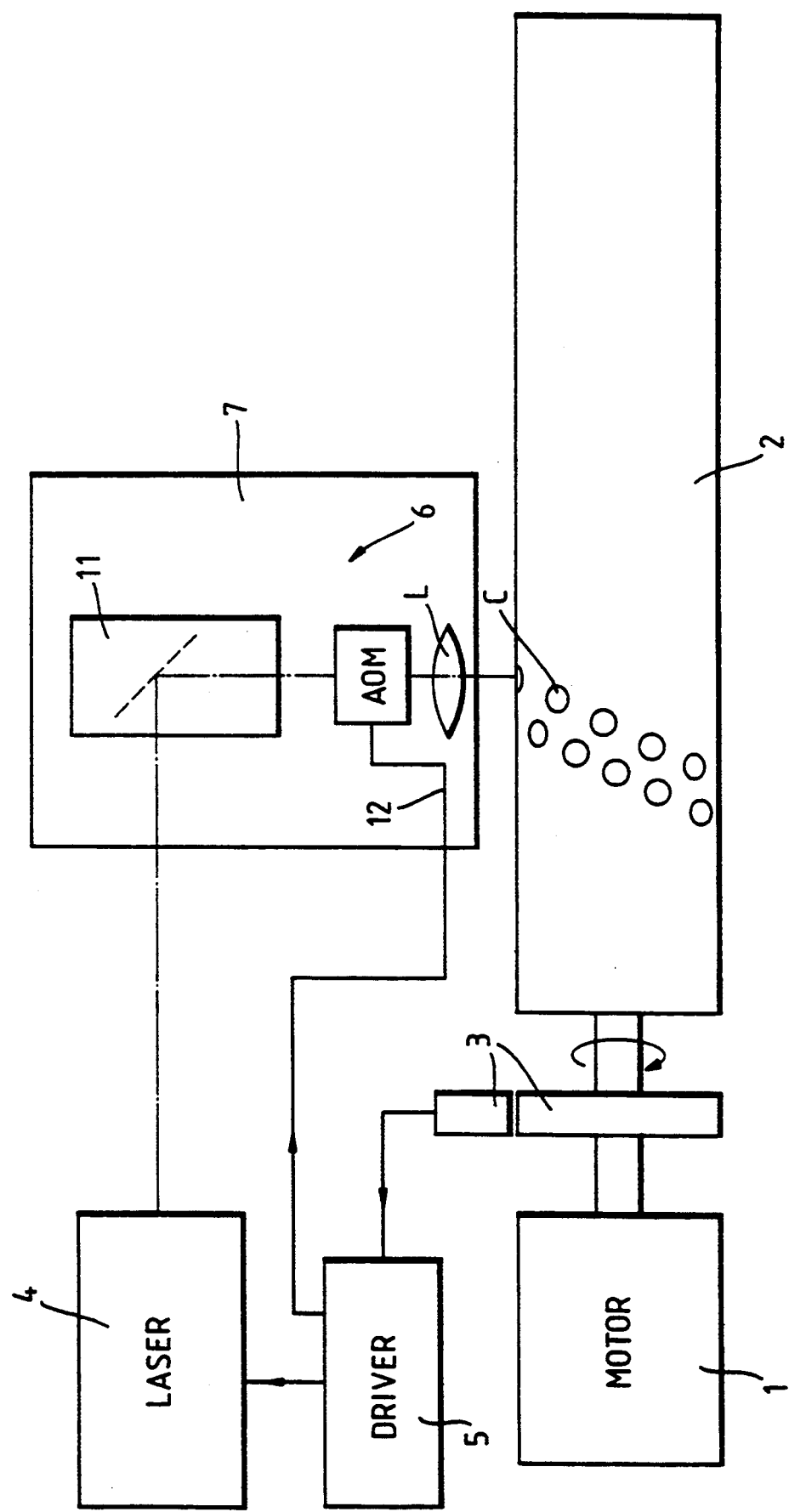
FIG. 1 is a diagrammatic plan elevation of part of an engraving machine.

A laser engraving machine for engraving anilox rollers comprises a drive 1 which rotates an anilox roller 2 about its longitudinal axis. An encoder 3 attached to the drive 1 provides an output dependent on the angular position of the roller 2. A continuous wave (CW) laser 4 with a polarised output driven by a laser driver 5 provides engraving pulses which are focused on the surface of the anilox roller 2 by a focusing element in a laser engraving head 6. The laser engraving head 6 is mounted on a carriage 7 which is movable in the axial direction along the anilox roller 2. The engraving head 6 includes an optical system including a plane mirror and the focusing element which, in the present example, is a focusing lens L which directs light from the laser onto the surface of the cylinder to engrave a series of cell sites C. In FIG. 1, the size, separation and helix angle of the cells are exaggerated for clarity. The physical construction of the laser engraving machine is generally conventional and will not be described in further detail.

Figure 2:
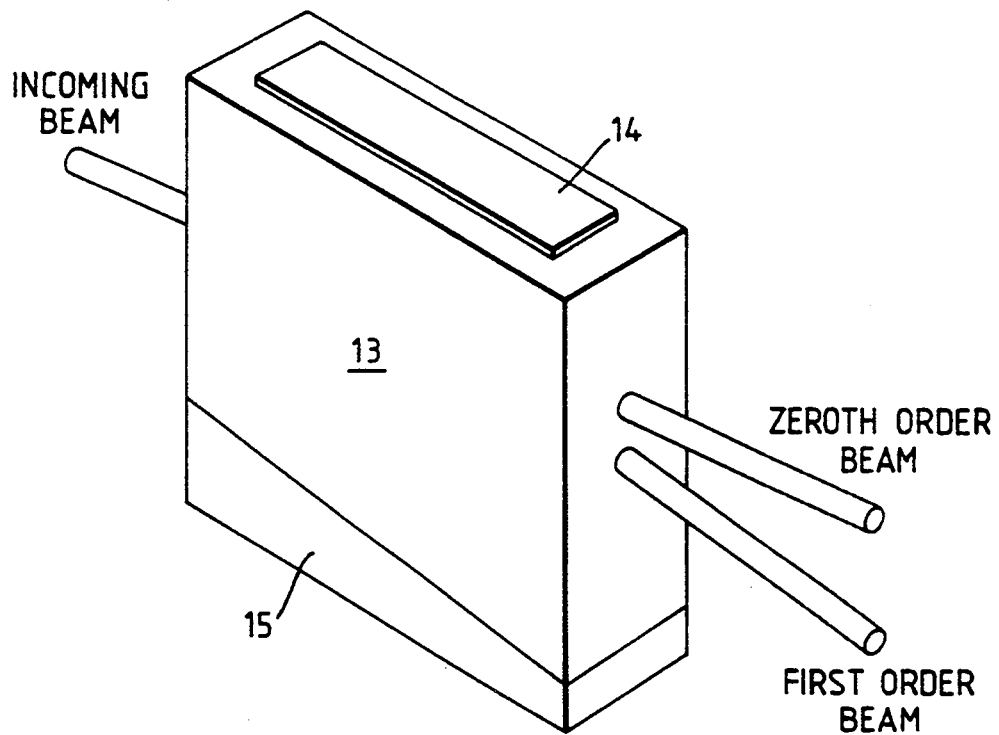
FIG. 2 is a perspective view of an acousto-optic modulator.

An acousto-optic modulator 12 is mounted with the engraving head 6 on the carriage 7 in the path of the laser beam from the laser 4. An acousto-optic modulator is shown in further detail in FIG. 2. It consists of a single-crystal block of germanium 13 which provides a solid interaction medium for the laser beam. A piezoelectric transducer 14 is mounted on one face of the cell and an acoustic absorber 15 on the opposite face.

The principal of operation of the cell is to apply a RF voltage to the transducer so that an acoustic wave is generated in the germanium. This acoustic wave propagates across the block at 5.5 mm/μs and in turn generates strain-induced changes of refractive index. Since these changes are periodic, the cell acts as a thick diffraction grating. By analogy with X-ray diffraction through single crystals this is termed Bragg diffraction.

Figure 3:
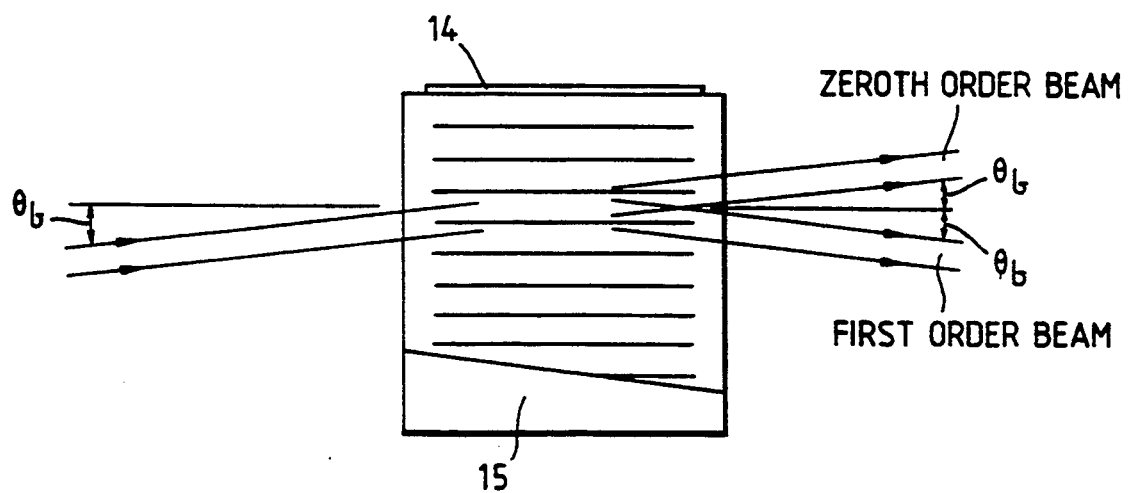
FIG. 3 is a diagram illustrating diffraction geometry.

FIG. 3 illustrates the diffraction geometry. For maximum diffraction efficiency into just one diffraction order, the incident beam should be incident on the cell at the Bragg angle $\Theta_b$. This angle is given by $$\Theta_b = \frac{\text{wavelength of incident } IR \times \text{frequency of } RF}{2 \times v_s}$$

where $v_s$ is the velocity of sound in germanium $$\Theta_b = 10.6 \ \mu m \times 40 \ \text{MHz}/(2 \times 5.5 \ \text{mm}/\mu s)$$
$$= 38.5 \ \text{mrad}$$

The full angle between the emerging beams of the zeroth and first orders is twice $\Theta_b$ which is 77 mrad or 4.4°. At this angle, the diffraction efficiency into the first order is high at >80%, for radiation polarised in the plane of deflection.

In the present example, the acousto-optic modulator 12 is of the type known as an acousto-optic deflector (AOD). It comprises a line of several transducers mounted on one face of the active medium. Typically as many as 4 to 6 separate transducers are used. A fixed time delay is introduced in the drive signal to each transducer so that the wavefront of the acoustic waves has a stepped rather than planar profile. By appropriate choice of the time delay, the angle of the wavefronts to the fixed direction of the incoming optical beam can be set close to the Bragg angle $\Theta_b$ for a range of acoustic frequencies. This makes possible deflection of the beam over a range of different angles without significant loss in deflection efficiency.

Figure 4:
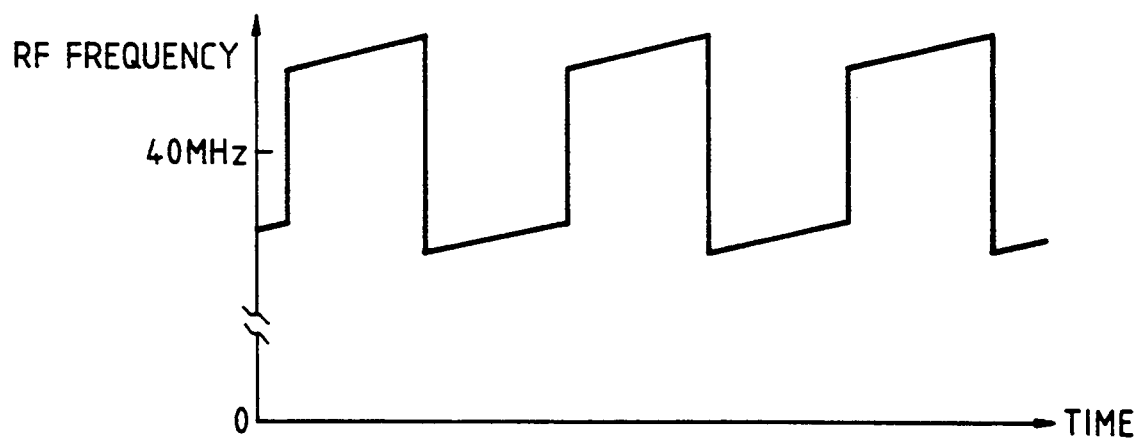
FIG. 4 is a frequency-time plot for the RF signal applied to the modulator of FIG. 2.
Figure 4:
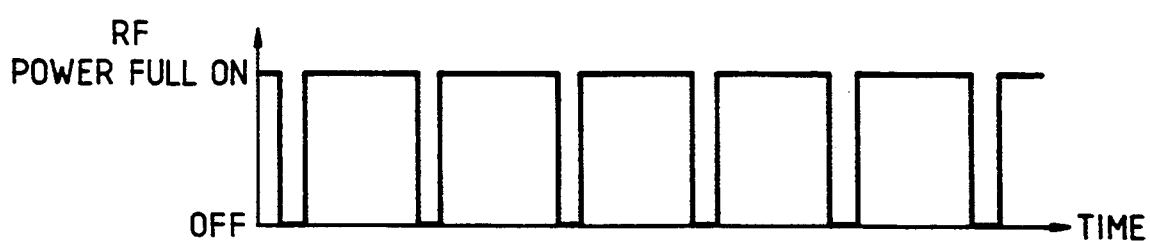
Figure 5:
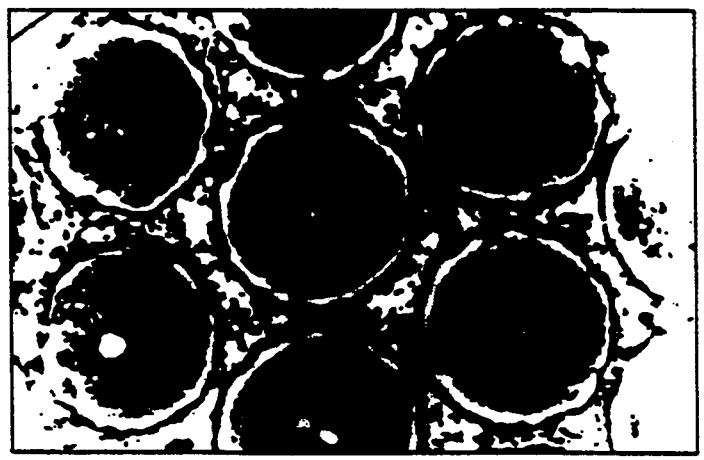
FIG. 5 is a photomicrograph showing cells engraved using the method of the present invention.

The spacing of the periodic changes of refractive index, and hence the angle through which the first order beam is diffracted, depends upon the applied RF frequency. In anilox engraving, the focusing lens for concentrating the laser beam onto the ceramic surface converts the beam direction into a position in the image plane on the surface. FIG. 4 shows the applied RF frequency used in the present invention as a function of time. By ramping the RF frequency with an appropriate gradient, the focused spot is caused to follow or track the surface of the cylinder so that the relative speed of the spot and the cylinder is zero. FIG. 5 is a photomicrograph showing cells engraved using this method and shows that the method is effective to prevent oval deformation of the cells due to relative motion of the engraving beam and the cylinder.

After the beam has tracked a given cell site for long enough to engrave the site to the required depth, the RF power is switched off the frequency applied to the acousto-optic modulator is changed discontinuously to a different value in order to move the beam on the surface of the cylinder at high speed from the current cell site to another cell site. The RF power is then switched on again. In the present example the beam is alternately deflected by two units of cell separation ahead and then behind the lens axis. Thus, for example, the beam is first deflected by +2 units onto what will become cell No. 1 and tracks this in the positive direction until cell No. 1 is formed. (Meanwhile, the roller has rotated by +1 cell unit). The beam is now deflected by −2 units and tracking the roller, as before, in the positive direction forms cell No. 2. This example produces an engraving sequence that includes $C_5$, $C_{10}$, $C_7$, $C_{12}$, $C_9$, $C_{14}$, $C_{11}$, $C_{16}$ . . . and so on. This method provides a minimum separation between any successively engraved cells of three cells, corresponding to a cooling time of two periods of the engraving frequency. Other deflection patterns may be used, giving shorter or longer times between contiguous cells on the ceramic surface.

Further jump sequences are as follows:
1. A minimum of two full cooling periods between any adjacent cells requires a jump sequence of two cell units ahead of the optical axis alternating with two cell units behind, or +2/−2. This sequence would give the following placement of cells which are numbered according to order or time of placement (in units of pulsing period):

| 5 | 2 | 7 | 4 | 9 | 6 | 11 | 8 | 13 | 10 | 15 | 12 |
|---|---|---|---|---|---|----|---|----|----|----|----|

2. A minimum of four full cooling periods between any adjacent cells is achieved with a jump sequence of three cell units alternating ahead and behind the optical axis, i.e. +3/−3. This sequence gives the following placement order:

| 7 | 2 | 9 | 4 | 11 | 6 | 13 | 8 | 15 | 10 | 17 |
|---|---|---|---|----|---|----|---|----|----|----|

3. A double hit of each cell is achieved by jumps of (3+2n)/4 (where n is an integer) alternating ahead and behind the optical axis. For +0.75/−0.75, the sequence is:

| 1st hits | 2 | 4 | 6 | 8 | 10 | 12 |
|----------|---|---|---|---|----|----|
| 2nd hits | 5 | 7 | 9 | 11 | 13 | 15 |

This leaves two full cooling periods before the second hit. For +1.25/−1.25, the sequence is:

| 1st hits | 2 | 4 | 6 | 8 | 10 | 12 |
|----------|---|---|---|---|----|----|
| 2nd hits | 7 | 9 | 11 | 13 | 15 | 17 |

This leaves four full cooling periods before the second hit. However the minimum cooling time between adjacent hits is one full cooling period in both cases above (because the hits in each row are separated by two units).

4. For engraving double hits at high frequency, it is necessary for more than one full cooling period between adjacent second hits which is not achieved for the sequences in 3. above. An interlaced sequence is required where the jumps are −2½/−1/+1½/+3 giving:

| 1st hits | 8 | 2 | 12 | 6 | 16 | 10 | 20 |
|----------|---|---|----|---|----|----|----|
| 2nd hits | 11 | 5 | 15 | 9 | 19 | 13 | 23 |

The minimum cooling time is two full periods from the first hit and two full periods for adjacent cells at any time (e.g. the soonest adjacent cell after the 9th is the 12th).

In an alternative embodiment, the acousto-optic modulator is excited simultaneously with two RF frequencies so that two first order beams are formed to provide two side-by-side engraving sites on the cylinder. Since two cells are engraved at the same time the time for engraving a given cylinder is halved.

In a further alternative embodiment, described as a "double hit" in the above sequences, after each cell has been once engraved, the beam is deflected away to engrave other cell sites while the one site cools. The beam is then deflected back to the one site to remelt that site so as to provide a deeper cell and/or a cell of better quality. The optical energy focused on the site may be reduced for the remelting phase of the engraving.

Figure 6:
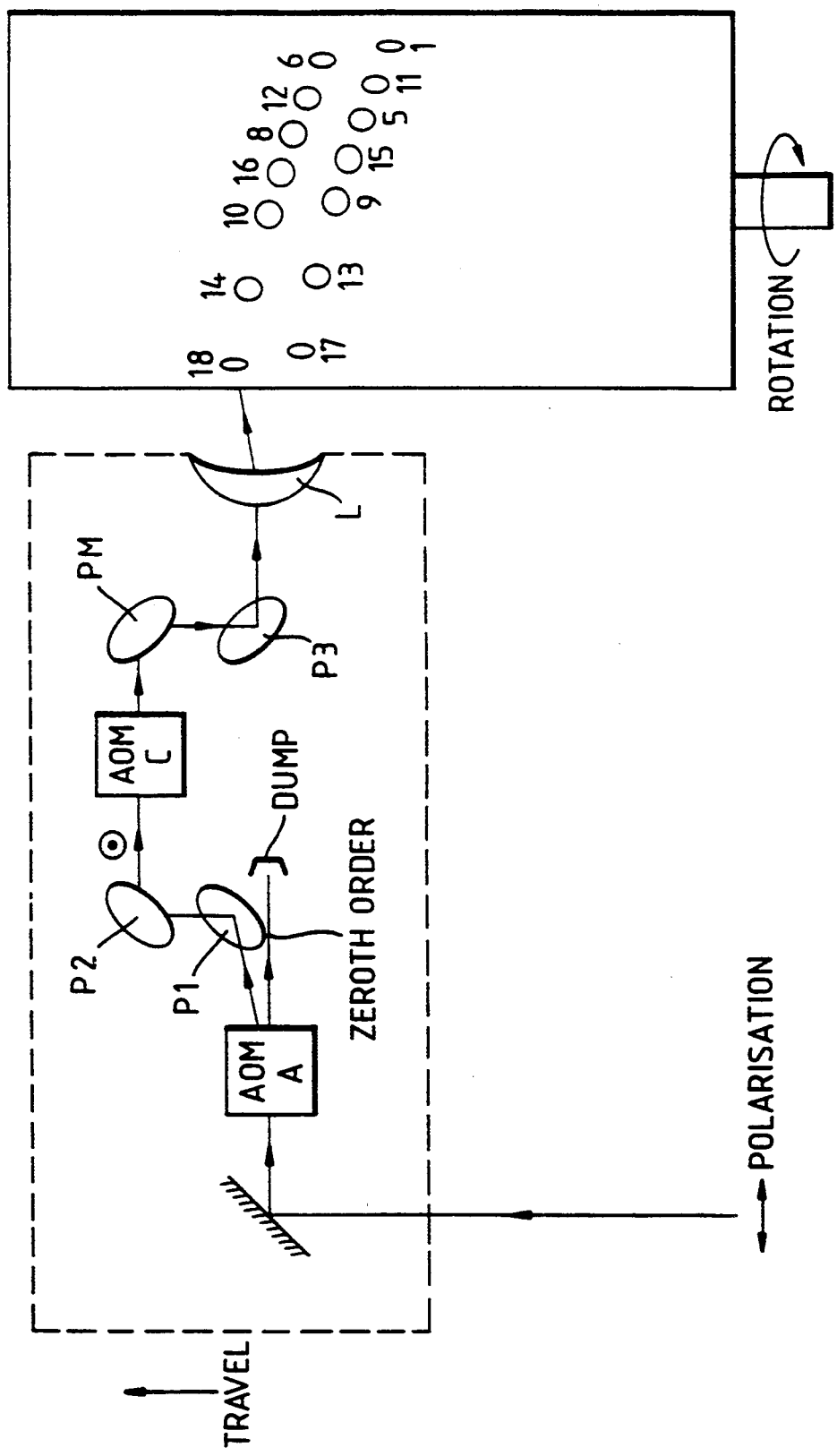
FIG. 6 is a diagrammatic plan elevation of an alternative embodiment.
Figure 7:
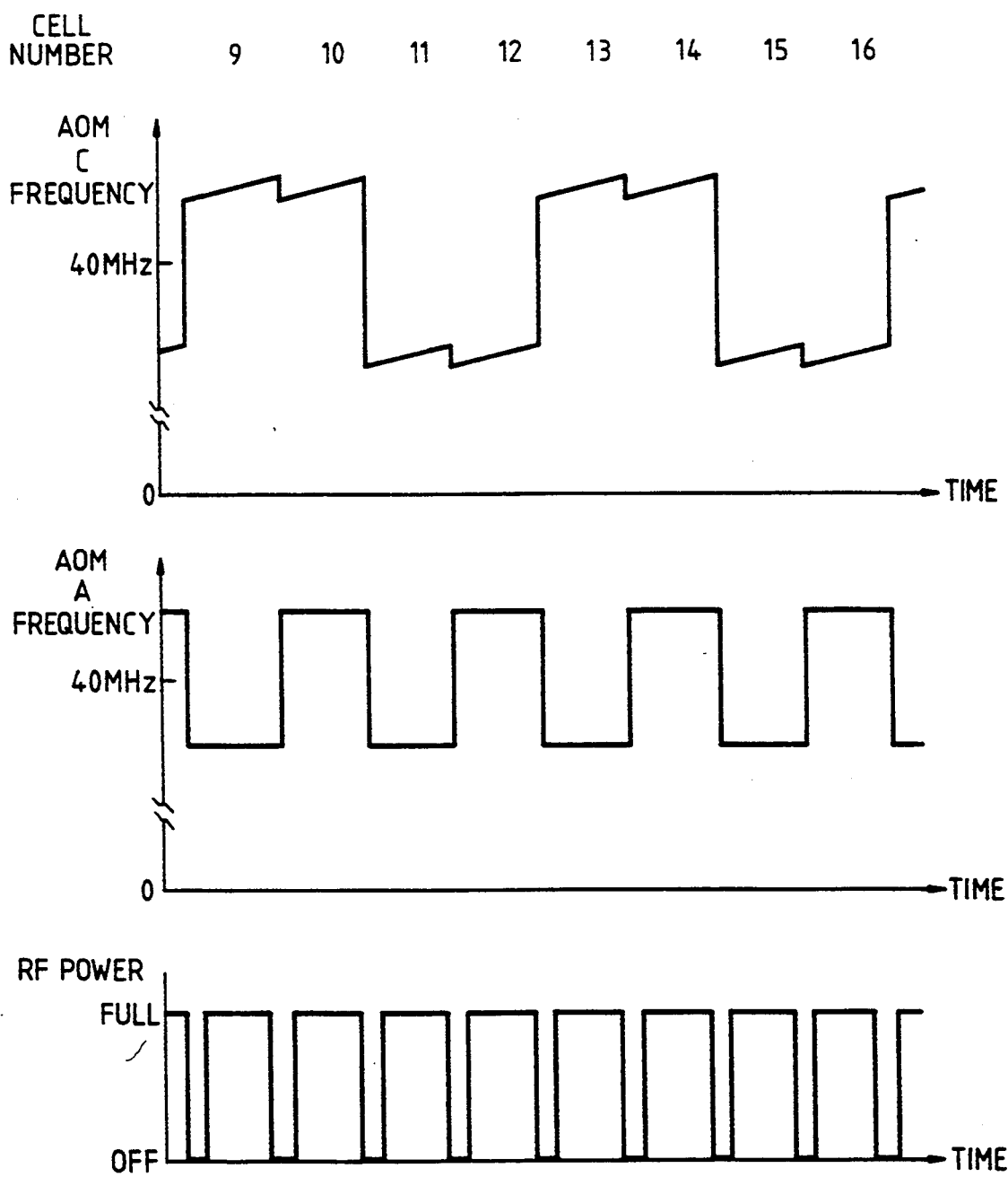
FIG. 7 is a frequency-time plot for the RF signal applied to the modulator of FIG. 6.

A further embodiment involves the use of two acousto-optic modulators A,C to deflect the beam in two directions from the axis through the lens. In the technique of deflecting the beam alternatively ahead and then behind described earlier, the number of units of deflection is limited by the off-axis performance or aperture limit of the focusing lens. By using an independent deflection parallel to the axis of the cylinder, cells can be engraved on another helix. This is separated from the first helix by an integer number of units of axial cell separation. If the integer is odd the pitch of advance for the productivity of engraving is doubled. If the integer is even the productivity remains the same but each cell will be engraved twice. The arrangement is shown in FIG. 6. It is necessary to rotate the plane of polarisation between the two acousto-optic modulators. This is achieved by two circular polarising mirrors P1,P2. A plane mirror M and a further circular polariser P3 are positioned following the second cell AOM C. The driving signals are shown in FIG. 7 for the engraving sequence in FIG. 6.

Although the above embodiments relate to the preparation of anilox cylinders, the present invention is equally applicable to the preparation of other types of cylinder, including printing cylinders for use in flexographic, rotogravure, galvano, or photo-lithographic processes. Rather than engraving material from the surface of the cylinder the laser may be used to expose a photo-resist which is subsequently developed. In the case of galvano printing sleeves, the sharp transition between cells made possible by the present invention, is of particular value in the production of different sized cells in different regions of the sleeve to provide different ink flows.

I claim:
1. A system comprising, in combination, an anilox roller, and an apparatus for preparing the roller for use in a printing process, the apparatus comprising means to support the roller for rotation about an axis and a head (6,7) mounted for movement parallel to the axis including means to direct a laser beam onto the surface of the roller to engrave or expose a series of cell sites (C) around the roller characterised by an acousto-optic modulator (12) positioned in the path of the laser beam and arranged to deflect the beam substantially in the direction of rotation of the anilox roller (2).

2. A system according to claim 1, in which the acousto-optic modulator (12) is arranged to deflect the beam so that it tracks the surface of the medium at a speed matched to the speed of the medium to keep the beam stationary on a cell site (C) while that site is being engraved or exposed.

3. A system according to claim 1, in which the laser is a continuous wave (CW) laser and the acousto-optic modulator (12) is arranged to deflect the beam between cell sites (C) at a speed very much greater than the speed of rotation of the medium.

4. A system according to claim 1, in which the acousto-optic modulator (12) is arranged to deflect the beam to a cell site (C) other than the sites immediately preceding and following the one cell site in the direction of rotation of the medium.

5. A system according to claim 1, in which the acousto-optic modulator (12) includes a plurality of transducers mounted on one face of the modulator and arranged to generate a stepped acoustic wavefront at an angle to an incoming optical beam.

6. A system according to claim 1, in which the acousto-optic cell (12) is arranged to split the laser beam to engrave a plurality of sites on the medium simultaneously.

7. A system according to claim 6, in which the acousto-optic cell (12) includes means for applying two RF exciting frequencies simultaneously.

8. An apparatus for preparing a medium for use in a printing process comprising means to support the medium for rotation about an axis and a head (6,7) mounted for movement parallel to the axis including means to direct a laser beam onto the surface of the medium to engrave or expose a series of cell sites (C) around the medium, said means to direct a laser beam including an acousto-optic modulator (12) positioned in the path of the laser beam and arranged to deflect the beam substantially in the direction of rotation of the medium (2) so that the acousto-optic modulator tracks the surface of the medium at a speed matched to the speed of the medium to keep the beam stationary on a cell site (C) when the site is being engraved or exposed, and wherein the acousto-optic modulator (12) deflects the beam between cell sites (C) at a speed very much greater than the speed of rotation of the medium.

9. An apparatus according to claim 8, in which the medium (2) is a cylinder for use in a printing process.

10. An apparatus according to claim 9, in which the cylinder is an anilox roller.

11. An apparatus according to claim 8, in which the laser is a continuous wave (CW) laser and the acousto-optic modulator (12) is arranged to deflect the beam between cell sites (C) at a speed very much greater than the speed of rotation of the medium.

12. An apparatus according to claim 8, in which the acousto-optic modulator (12) is arranged to deflect the beam to a cell site (C) other than the sites immediately preceding and following the one cell site in the direction of rotation of the medium.

13. An apparatus according to claim 8, in which the acousto-optic modulator (12) includes a plurality of transducers mounted on one face of the modulator and arranged to generate a stepped acoustic wavefront at an angle to an incoming optical beam.

14. An apparatus according to claim 8, in which the acousto-optic cell (12) is arranged to split the laser beam to engrave a plurality of sites on the medium simultaneously.

15. An apparatus according to claim 14, in which the acousto-optic cell (12) includes means for applying two RF exciting frequencies simultaneously.

16. A method of preparing an anilox roller for use in a printing process comprising supporting the roller for rotation about an axis and directing a laser beam onto the surface of the medium from a head mounted for movement parallel to the axis, characterised by passing the beam through an acousto-optic modulato and thereby deflecting the beam substantially in the direction of rotation of the medium.

17. A method of preparing a medium (2) for use in a printing process comprising supporting the medium for rotation about an axis and directing a laser beam onto the surface of the medium from a head mounted for movement parallel to the axis, the beam engraving or exposing a series of cell sites (C) around the medium, characterised by deflecting the beam in the direction of rotation of the medium so as to track a cell site (C) while the cell site is engraved or exposed, and subsequently deflecting the beam between cell sites (C) at a speed very much greater than the speed of rotation of the medium.

* * * * *